March 2, 1954

F. A. LANDGRABER, SR
APPARATUS FOR COMPLETING AND PACKAGING
A FROZEN CONFECTION

Filed Nov. 6, 1951

INVENTOR
Fred A. Landgraber, Sr.

BY
Mason, Fenwick & Lawrence
ATTORNEYS

Fig. 2.

INVENTOR
Fred A. Landgraber, Sr.
BY Mason, Fenwick & Lawrence
ATTORNEYS

March 2, 1954

F. A. LANDGRABER, SR 2,670,887

APPARATUS FOR COMPLETING AND PACKAGING
A FROZEN CONFECTION

Filed Nov. 6, 1951

INVENTOR

Fred A. Landgraber, Sr.

BY Mason, Fenwick & Lawrence

ATTORNEYS

March 2, 1954

F. A. LANDGRABER, SR 2,670,887

APPARATUS FOR COMPLETING AND PACKAGING
A FROZEN CONFECTION

Filed Nov. 6, 1951

INVENTOR
Fred A. Landgraber, Sr.

BY Mason, Fenwick & Lawrence
ATTORNEYS

March 2, 1954  
F. A. LANDGRABER, SR  
APPARATUS FOR COMPLETING AND PACKAGING A FROZEN CONFECTION  
2,670,887

Filed Nov. 6, 1951  
11 Sheets-Sheet 9

Fig. 12.

INVENTOR  
Fred A. Landgraber, Sr.  
BY  
Mason, Fenwick & Lawrence  
ATTORNEYS

Patented Mar. 2, 1954

2,670,887

UNITED STATES PATENT OFFICE 2,670,887

APPARATUS FOR COMPLETING AND PACKAGING A FROZEN CONFECTION

Fred A. Landgraber, Sr., Port Newark, N. J., assignor to Drumstick, Inc., Fort Worth, Tex., a corporation of Texas Application November 6, 1951, Serial No. 255,115

7 Claims. (Cl. 226—2)

This invention relates to apparatus for making a finished ice cream confection and packaging it, starting with a filled hard frozen ice-cream cone in which the ice cream extends beyond the rim of the cone, usually in a convex mound of uniformly smooth contour. The finished confection comprises this cone with the projecting part of the filler enrobed with chocolate or other edible coating, which is preferably studded with comminuted nut meats or other edible granules. The term "ice cream" is used as an example of a number of equivalent frozen fillers.

One of the objects of the invention is to provide apparatus for making a frozen confection such as is above described, which is untouched by human hands throughout the extent of its manufacture and packaging.

Another object of the invention is to provide apparatus in which all parts with which the product or its ingredients come into contact are readily disassemblable so that they can be removed for thorough cleansing.

Still another object of the invention is the provision of apparatus including means for conveying baskets of filled cones successively, first to an enrobing station, then to a nut applying station at which nut fragments are thrown from a vibratory plate against the enrobed surface of the cones, the vibrating means being responsive to the presence of a basket at the enrobing station, being inactive when there is no basket present at said enrobing station, whereby the action of the vibratory plate is discontinuous, minimizing the tendency of the nuts to "oil off," which they do excessively under continuous impact, resulting in oily surfaces of the nut fragments with resultant adhesiveness of the nuts to the enrobed surface of the cones.

A further object of the invention is the provision of a packaging machine in which two of the finished frozen confections are simultaneously released to a single packaging hopper, one being automatically detained for an instant in said hopper so as to assume linear sequence with respect to the other, enabling them to be automatically bagged consecutively.

Other objects of the invention will appear as the following description of a preferred and practical embodiment thereof proceeds.

In the drawings which accompany and form a part of the following specification, and throughout the several figures of which the same reference characters denote identical parts:

Figure 2 is an end elevation viewed from the left in Figure 1a;

Before proceeding to a detailed description of the apparatus it may facilitate the understanding of the description to state at this point that the filled cones come to the apparatus in a known type of basket in which the cones are held head down; that the baskets slide on tracks which extend through the machine; and that the movement of the baskets is step by step, first to an enrobing station at which the chocolate coating is applied, then to the nut applying station, and then to the packaging station; that the step by step movement of the baskets to the enrobing station and nut applying station is effected by an overlying rack bar having depending unidirectionally swinging pawls at proper intervals, which ride over a basket in the outward movement of the rack bar and engage the far side of the basket, drawing it inward upon the opposite stroke of the rack bar, the amplitude of reciprocation of this rack bar being such that it stops the baskets in precise positions at the enrobing and nut applying stations. In packaging, one row of the finished confections at a time is removed from the basket, so that an amplitude of movement of the basket equal to the distance between rows is required. Consequently, a separate conveyor bar is employed at the packaging station, which is at the same level as the rack bar that serves the enrobing and nut applying stations and of similar construction with a closer spacing of pawls, excepting that it is not a rack bar but driven by a pitman, the two conveyor bars having their adjacent ends so juxtaposed that the first mentioned conveyor bar carries the basket to a position where its near end is engaged by the first pawl on the second mentioned conveyor bar.

Figure 1A:
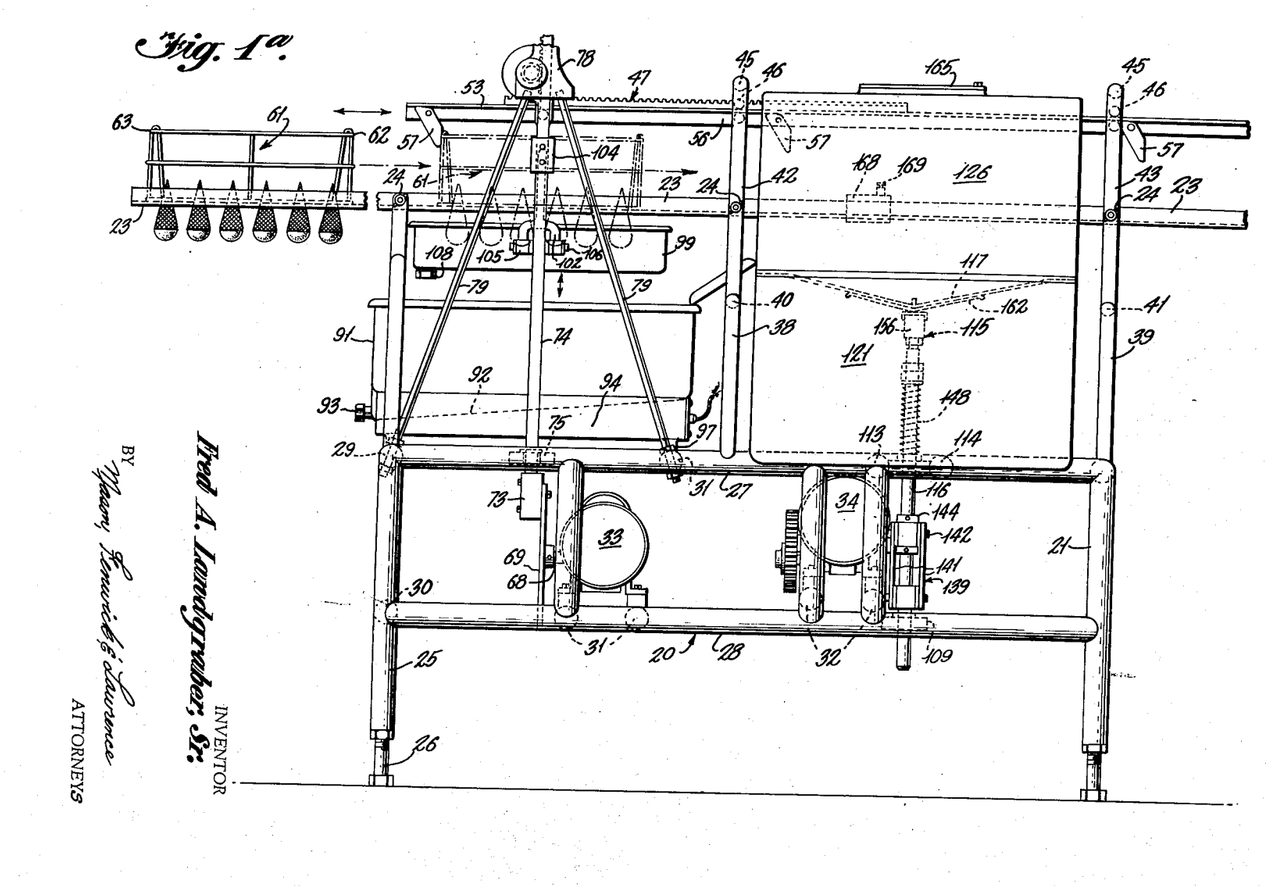
Figures 1a and 1b are complementary side elevations of apparatus embodying the principles of the invention.
Figures 1B, 16:
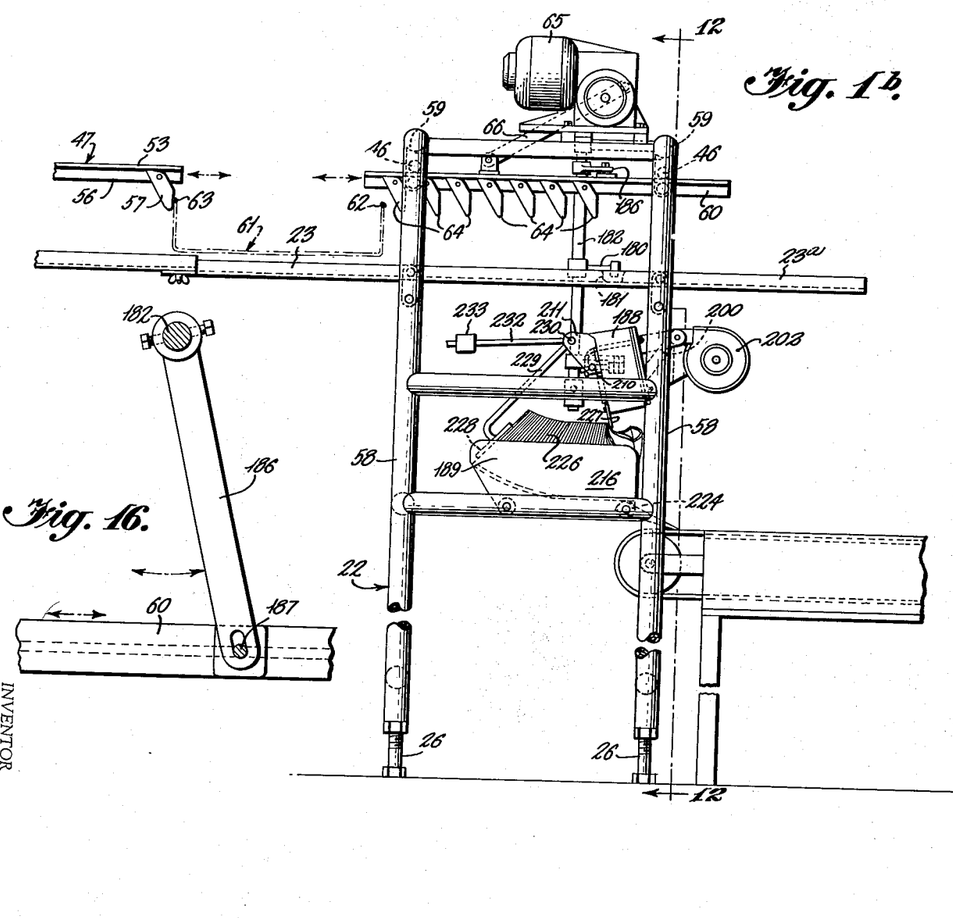
Figure 16 is a section taken along the line 16—16 of Figure 13.

With this general outline of the arrangement of the apparatus, the detailed description is as follows:

The apparatus comprises a portable frame, which as a whole is designated by the numeral 20, and which in the form shown is made in two sections 21 and 22, Figures 1a and 1b, which could be integrally related as a matter of choice, and are in fact unitary when the track 23 is in place, since the latter extends rigidly through both sections of the frame. As the track can be disassembled through the instrumentality of the wing nuts 24 and taken out for cleaning, this being the only operative element that extends through both sections, makes it convenient to be able to push the section 22 aside to get full access to both sections, which is the chief reason for making the frame in separate sections.

Figure 2:
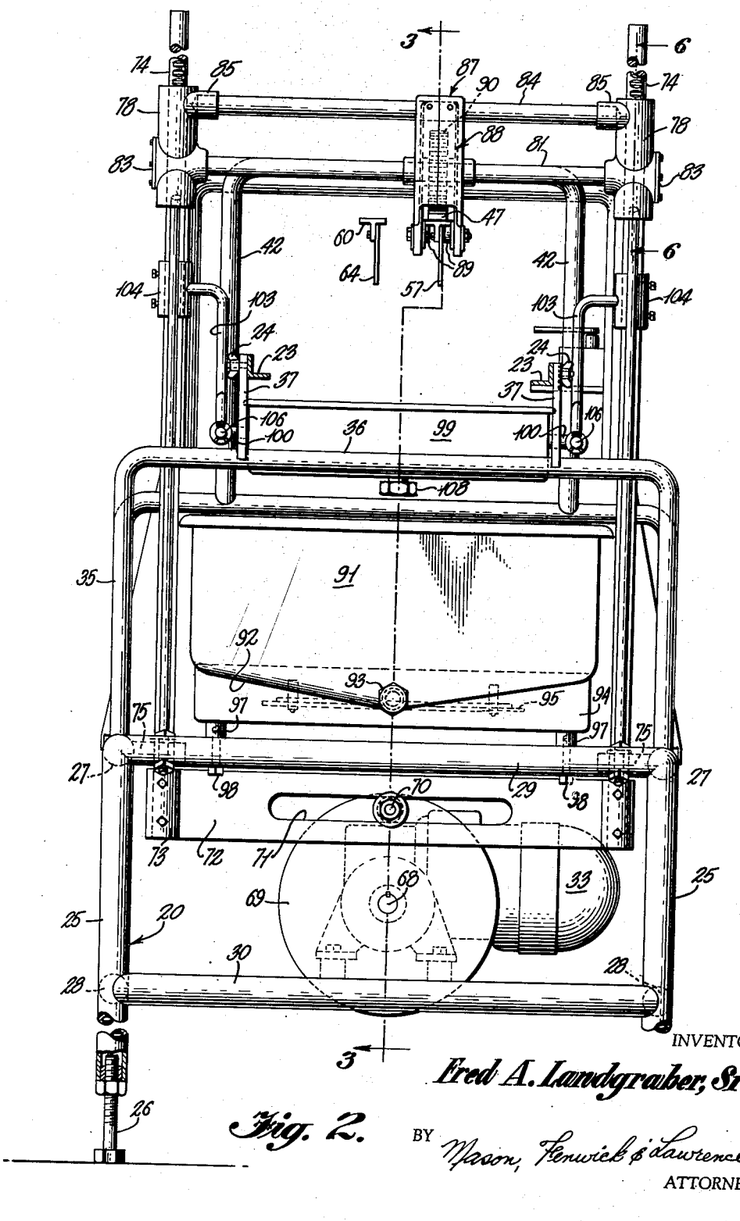

The frame section 21 can be comprehended from Figure 1a and Figure 2. It consists of corner posts 25, having levelers 26 at the foot, upper and lower longitudinals 27 and 28, and upper and lower end cross pieces 29 and 30. The lower longitudinals are bridged by two pairs of spaced intermediate cross pieces 31 and 32, the pieces 31 supporting the motor 33 that operates the enrobing mechanism and the rack bar which brings the baskets to the enrobing and nut applying stations. The pair of cross pieces 32 support the motor 34, which operates the nut meat applying mechanism. At the outer end of the frame arises the inverted U-shaped member 35, having the cross rail 36 that carries the spaced uprights 37 with holes at their upper ends, receiving the threaded studs which project from the angular tracks 23, secured to said uprights by wing nuts 24 screwing upon said studs (see Figure 2).

At the middle of the upper longitudinals 27 and at the inner end of the frame section 21 rise the similar inverted U-shaped members 38, 39, and supported from the cross rails 40 and 41 of these members are the inverted U-shaped extensions 42 and 43, the sides of which are spaced narrowly enough to support the parallel tracks 23 with the aid of tubular spacers 44 (see Figure 5), through which spacers the threaded studs on the back of the track extend. Other wing nuts 24 screw on these studs and secure the track to the sides of these extensions. All of the frame members are preferably made of tubular stock and preferably of stainless steel or other bright and polished metal which can be kept in immaculate sanitary condition.

Figures 6, 8:
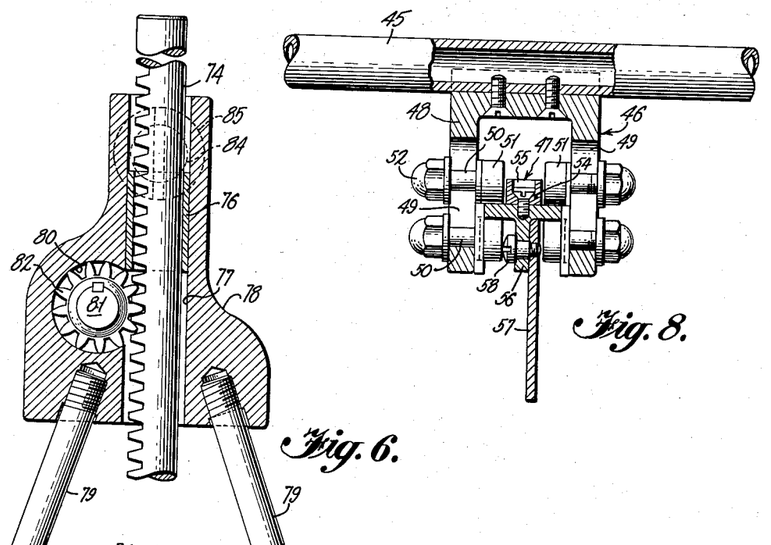
Figure 6 is a vertical section taken along the line 6—6 of Figure 2.
Figure 8 is a section taken along the line 8—8 of Figure 4.

The top rails 45 of the extensions 42 and 43 are at the same height and carry the hangers 46 which support and guide the reciprocating rack bar 47. Figure 8 shows a fragment of one of the top rails 45 and a section through one of the hangers. This member comprises an inverted channel shaped fitting 48 secured to the under side of the top rail, and having vertical adjusting slots 49 in its opposite sides. Bolts 50 extend through these slots, having rollers 51 at their inner ends and nuts 52 at their outer ends for securing the bolts in adjusted positions. The upper and lower pair of rollers are spaced. The rack bar 47 in the form shown is composite, comprising a lower part 53 of T-shape cross-section, with the top of the T resting upon the rollers of the lower pair and guided in the space between the upper and lower rollers. The stem of the T depends, forming the stiffening fin 56 of the rack bar. The upper part of the rack bar is a strip 54, having the rack teeth 55 and secured to the lower part 53, as by the screws shown. Pawls 57 are dependingly mounted on the fin 56 by the pivot pins 58. Figure 1a shows that the pawls 57 can swing freely to the right, but cannot swing leftward beyond the positions shown in Figure 1a, since they are stopped by contact of their upper left corners with the under side of the top of the T-shaped portion 53 of the rack bar.

Figure 12:
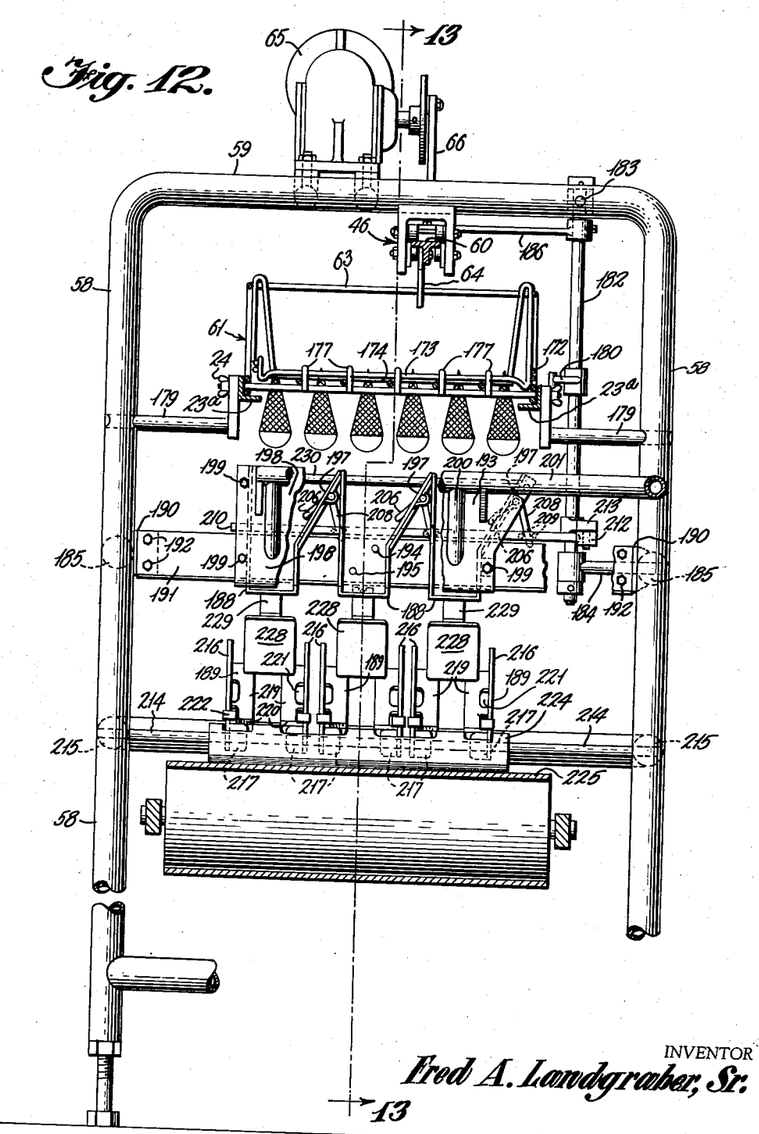
Figure 12 is a vertical cross-section taken along the line 12—12 of Figure 1b.
Figure 13:
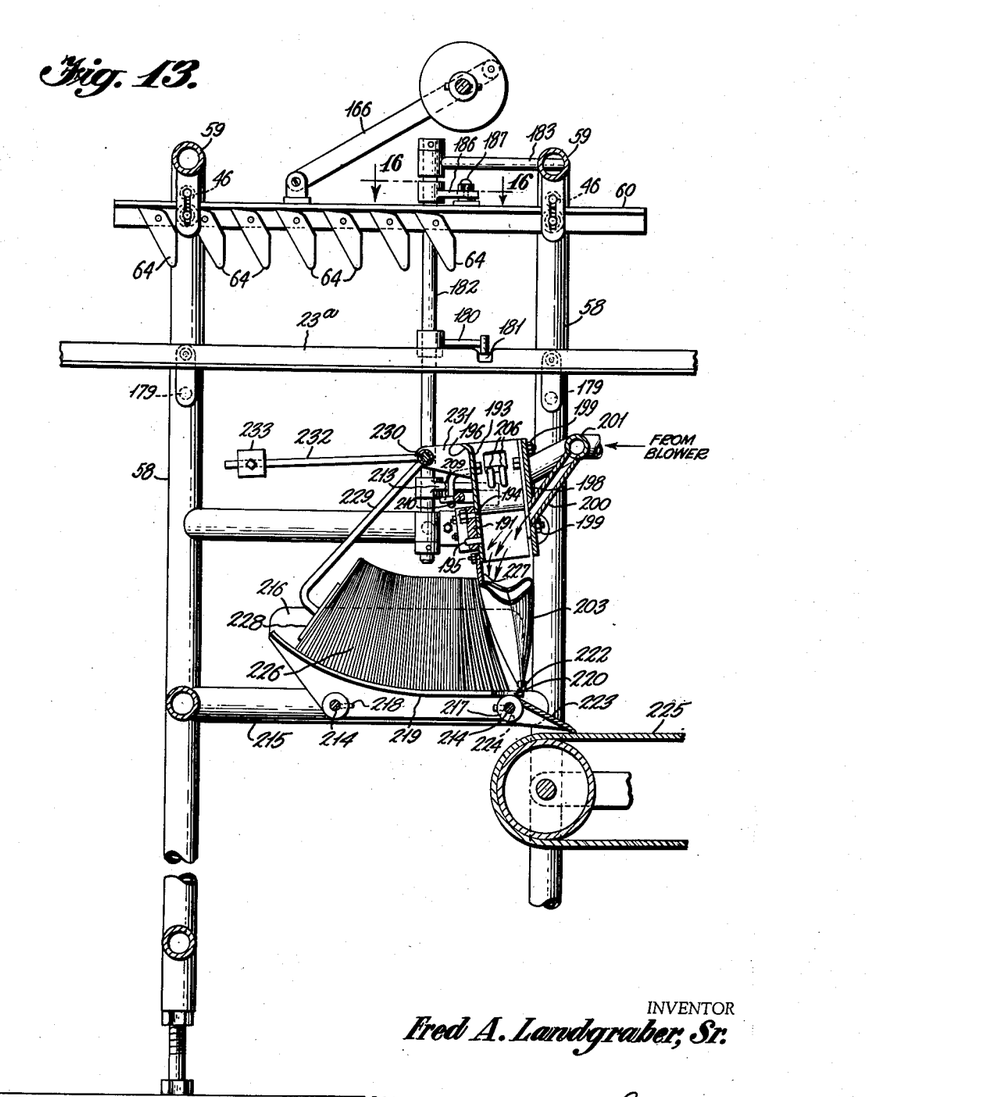
Figure 13 is a vertical cross-section taken along the line 13—13 of Figure 12.

Now adverting to the frame section 22, this can be best contemplated from Figure 1b and Figures 12 and 13. It has a general prismatic outline, consisting of the four corner posts 58, joined by transverse top rails 59, each supporting a hanger 46, through which hangers a conveyor bar 60 is slidably guided. The conveyor bar 60 is similar in construction to the rack bar 47, in that it is of T-shaped cross-section, the top of the T being guided between the rollers of the hanger, and the stem of the T being a reinforcing fin and carrying the unidirectionally swinging pawls 64.

Before describing the function of the conveyor bar 60 one may take a look at the basket 61, Figures 1a and 12, which show that the top wires 62 and 63 of the front and rear ends of the basket are of equal height, and that there are no transverse wires of the same height between the front and the rear of the basket, and that the cones are arranged in successive transverse parallel rows, six cones to a row.

Since the purpose of the conveyor bar 60 is to advance the basket, step by step, toward the right as viewed in Figure 1a, a row of cones at a time to a definite position at the packing station, the pawls 64 are spaced apart the distance between rows. There are seven of the pawls 64. These operate in the same manner as the pawls 57. However, beginning with the one on the left, Figure 1b, they successively catch on the front end of the basket upon successive retrograde strokes of the conveyor bar 60, pulling the basket forward on the advance strokes, a row at a time toward the point at the packing station where the cones are released. When the entire series of seven pawls has acted, the first row of cones is still the distance of one row behind the release point, but by that time, the leftmost pawl is in position to catch behind the rear of the basket. Now, one at a time, the series of pawls successively engage the back end of the basket and advance the cones a row at a time to the release point, at which point they are discharged from the basket a row at a time, as will appear. The rightmost pawl moves the basket the distance of one row beyond the release point, where it may be taken off of the track by a girl. If not immediately taken off, it will be pushed farther along on the track extension 23a by the next basket to be carried through the packing station.

Obviously, the conveyor bar 60 should reciprocate six times as fast as the rack bar 47, in order that baskets while at the packing station will not be overtaken by baskets delivered from the rack bar. The conveyor bar 60 is driven from the motor 65 by the pitman 66, through the intermediary of such gear reduction as will produce the proper rate of reciprocation.

The distance between the last pawl 57 of the rack bar 47 and the first pawl 64 of the conveyor bar 60, is equal to the length of the basket, so that the last pawl 57 pushes the basket to the point at which the first pawl 64 is able to catch its front end. Since different makes of baskets may be of different lengths, it may be necessary to adjust the distance between frame section 22 and frame section 21. To avoid the eventuality that the rack bar and conveyor bar might collide if the two frame sections are moved in too close juxtaposition, said bars are not in alignment but laterally offset, as is shown in Figure 2.

The rack bar 47 is operated from the gear reduction box 67 driven by the motor 33, which is supported by the cross pieces 31, and operates through gear reduction to rotate the output shaft 68 at 4 R. P. M. A crank wheel 69 is carried by the shaft 68, and has a crank pin 70 that operates through suitable antifriction bearings in the slot 71 of a cross head 72, moving the latter up and down. The cross head 72 is a flat transverse member, the ends of which are enlarged to form sockets 73. Vertical parallel toothed racks 74 are secured in said sockets at their lower ends and reciprocate with the cross heads. They are guided near the lower ends by the tubular bracket 75 through which they slide, and which extend inwardly from the upper longitudinals 27 of frame section 21, and near their upper ends they are guided by bushings 76 in vertical bores 77, formed in the heads 78, shown in detail in Figure 6.

The heads 78 are each carried by a pair of upwardly convergent rods 79, the upper ends of which are screwed into said heads and the divergent lower ends of which are secured to one of the upper end cross pieces 29 of the frame and the intermediate cross piece 31 which lies next to it. The heads and supporting rods are spaced transversely substantially the width of the frame. The heads are identical. Each has a gear recess 80, with an axial bearing bore for a shaft 81, the bored of both heads being in horizontal alignment, there being a shaft extending through said bores having a gear 82 in each recess, said gears being in mesh with the respective racks 74, by means of which the two racks move simultaneously, and in so moving they impart rotation to the shaft 81.

The heads 78 are provided with cover plates 83 for the recesses 80, giving access for lubrication, etc. Above the shaft 81 is a brace bar 84, the ends of which fit into aligned sockets 85 on confronting faces of the heads, said sockets and bar having registering bores 86 for taper pins which secure the bar and heads rigidly together, stiffening the upright structures constituted by said heads and the supporting rods 79.

Figure 7:
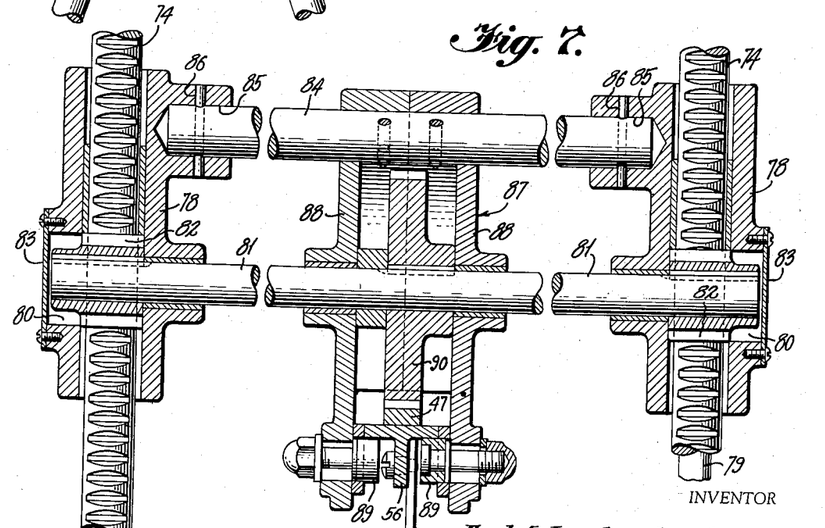
Figure 7 is a vertical section taken along the line 7—7 of Figure 3.

Figure 7 shows that the bar 84 at its middle supports a divided casing 87, through which the shaft 81 passes, the sides 88 of the casing having bearings in which the shaft is journaled. The lower part of the casing is formed as a hanger for the rack bar 47, which rests upon the adjustable rollers 89. Within the casing 87, and keyed to the shaft 81 is the gear 90 that meshes with the rack bar 47. The gears 82 which mesh with the racks 74 are small, while the gear 90 is large, so that the movement of the racks 74 is magnified in the movement of the rack bar 47, the amplitude of reciprocation of which is, as we have seen, the length of the basket.

Figure 3:
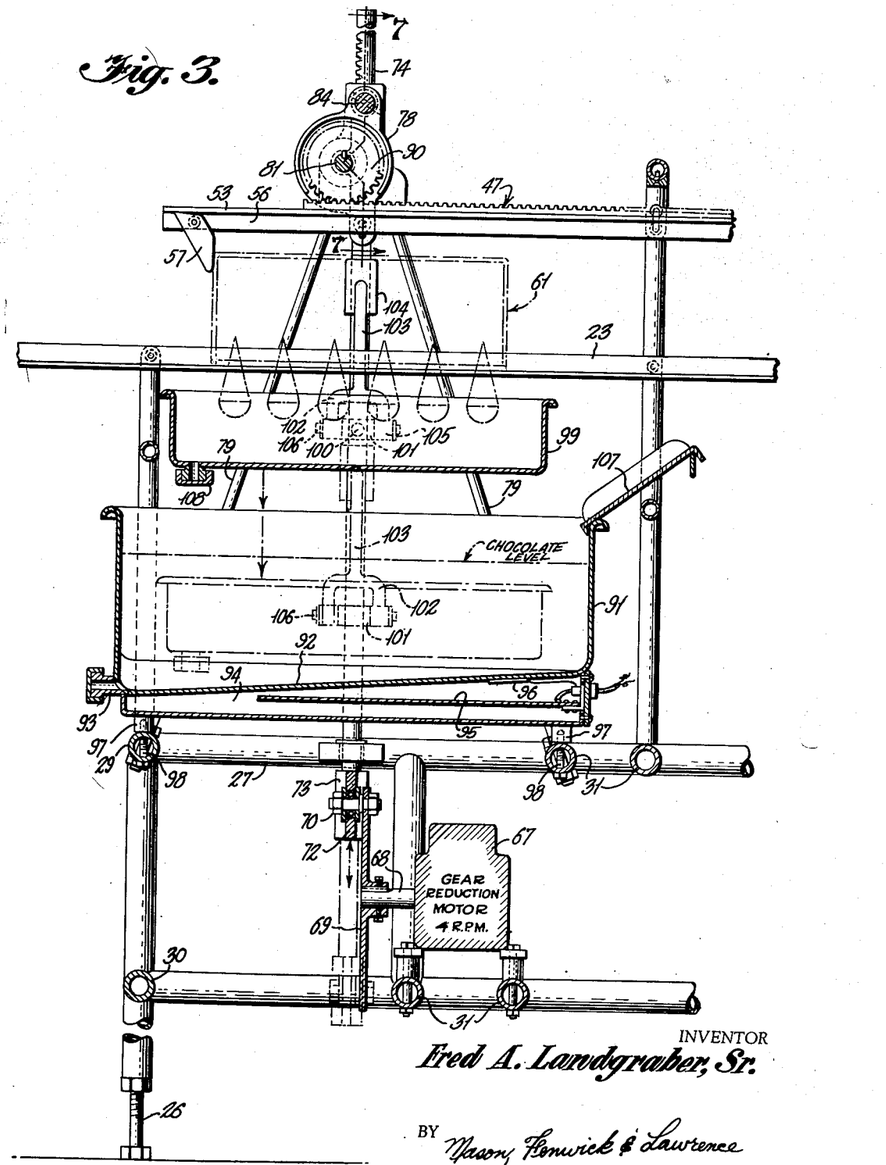
Figure 3 is a vertical section taken along the line 3—3 of Figure 2.

The racks 74 are also the means for operating the enrober. The latter comprise a deep rectangular pan 91 arranged symmetrically with respect to a vertical plane through the racks 74. Said pan is for a working supply of molten chocolate or other enrobing mixture. The bottom 92 of said pan slopes downwardly from both sides, and also from back to front, as seen in Figures 2, 3 and 1a, so as to drain to a single point at which there is a discharge spout 93 having a suitable closure. Beneath the pan, but forming part of the pan unit, is the heating chamber 94, which contains an electric heater 95 in proximity to the bottom of the pan, controlled by a thermostat 96, which is against the bottom of the pan and within the heating chamber (see Figure 3). The pan unit is removable, since it has external feet 97 on the bottom wall of the heating chamber, which rest upon adjacent upper cross pieces 29 and 31 of the frame, and are fastened thereto by the bolts 98.

A shallow and somewhat smaller constant level pan 99 dips into the larger pan to a depth below the level of chocolate in the larger pan, and therefore comes out each time brim full. It has handles 100 projecting from opposite sides, said handles terminating in eyes 101. Said eyes are straddled by the bifurcated ends 102 of supporting rods 103, which extend upward and outward, terminating in sockets 104, which surround the racks 74 and are adjustably secured thereto. The bifurcated ends of the rods 103 and eyes 105 which are aligned with the eyes in the handles, and pins 106, pass through said aligned eyes, removably securing the pan 99 operatively to the racks 74.

The small pan 99 therefore goes up and down with the racks 74. When it goes down, it fills with chocolate from the larger pan 91. As it comes up, the basket of inverted hard frozen cones is approaching along the track 23. As the basket gets over the pan 99, the latter in the final part of its rising movement, submerges the mounds of ice cream protruding from the cones in the warm enrobing mixture. As the pan 99 recedes and the basket of enrobed cones moves forward toward the nut applying station, the low temperature of the ice cream starts to quickly solidify the coating, which is not quite solid when it reaches the nut applying station, but is past the dripping stage. Any drip which may occur as the basket moves from over the pan 99 is caught on a fixedly supported inclined baffle 107, which overhangs the larger pan 91 and drains back to the larger pan. The pan 99 has a normally closed drain spout 108.

Referring for the moment particularly to Figure 1a, it will be understood that since the racks 74 commonly operate rack bar 47 and the enrobing pan 99, it follows that when said pan begins to descend, the basket starts to move forward toward the nut applying station, the pan having reached a point below the level of the cones when the first row of cones moves beyond the front end of the pan. The congellation of the chocolate coating has already progressed, so that there is but little drip in the region of the baffle 107; and by the time the basket reaches the nut applying station there is no drip, but the enrobed surface of the cone is sufficiently tacky to cause the nut fragments to adhere.

The nut applying station is located between the transverse frame members 38 and 39, and their extensions 42 and 43. A flat transverse bar 109, Figures 1a, 4, 5 and 11, is welded between the lower longitudinals 28, and at its middle carries the bushing 110. A similar bushing 111 is above the bushing 110, and in vertical alignment therewith, being supported by a bar 112 welded to the cross pieces 113 and 114 which extend between the upper longitudinals 27.

A vertical catapult 115 is supported by said bushings. It comprises a reciprocable stem 116 guided within said bushings, having a head which embodies a diaphragm 117.

Figure 4:
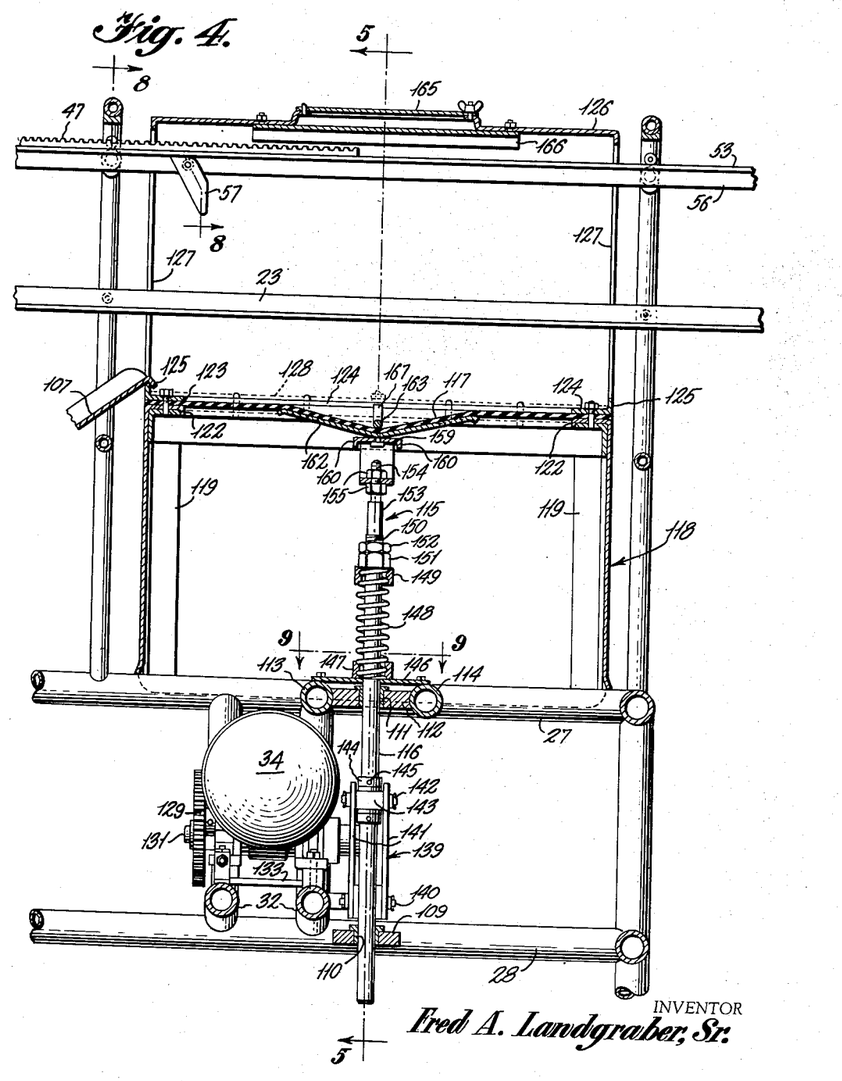
Figure 4 is a longitudinal vertical section through the vibratory nut meat applicator.
Figures 5, 15:
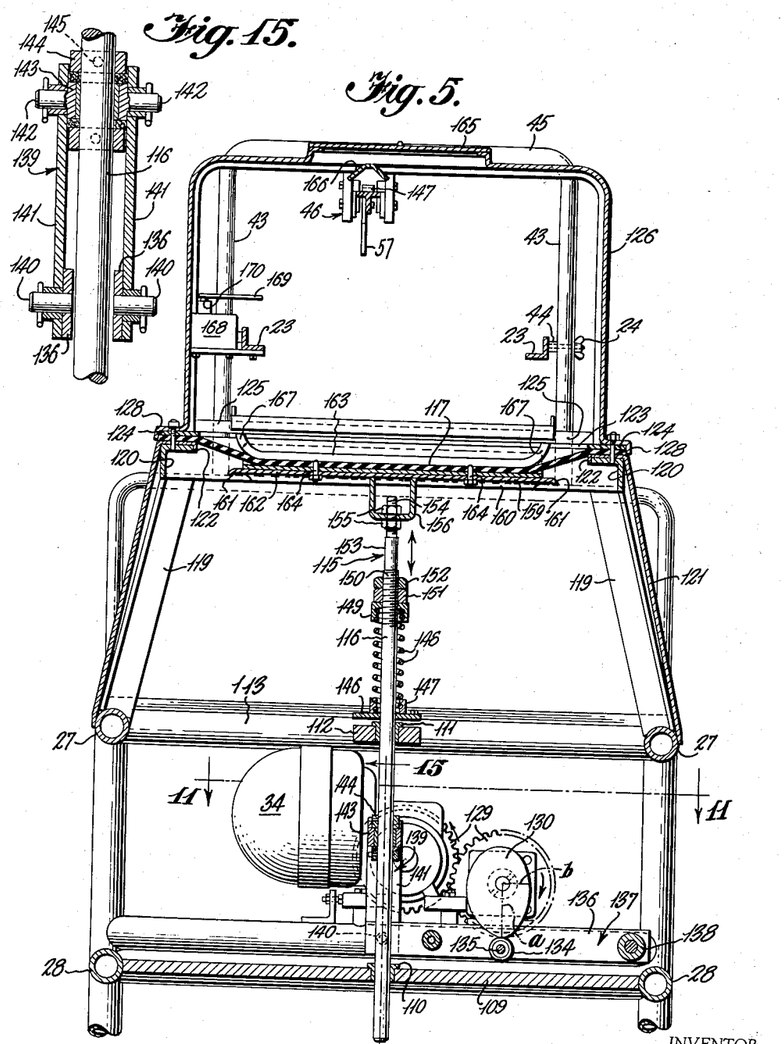
Figure 5 is a vertical section taken along the line 5—5 of Figure 4.
Figure 15 is a section taken along the line 15—15 of Figure 5.

A sub frame 118 is built about the upper portion of the stem of the catapult and supports the peripheral edge of the diaphragm in a common horizontal plane. Said sub frame is constructed of members of angle cross-section, comprising the legs 119 which are in vertical transverse planes but flare longitudinally, as shown in Figure 5. The lower ends of said legs are welded to the upper longitudinals 27. The legs support a rectangular surround 120 of angular cross-section, the vertical flanges of which is welded to the legs, and the upper flange of which extends horizontally. All four sides of the sub frame are enclosed within a sheet metal jacket 121, the top edge 122 of which is flanged over the upper flange of the surround in the manner shown in Figure 5, and constitutes the surface which directly contacts the peripheral margin of the diaphragm. On top of the diaphragm is a rectangular washer-like surround 123, the sides of which are flat, as shown at 124 in Figure 5, while the ends, that is, the transverse terminal portions, are bent upwardly to form short flanges 125, as seen in Figure 4. A tunnel-like casing 126 is provided, that is, it has closed top and side walls, but is open at both ends, as shown at 127 in Figure 4. The side walls have outwardly turned flanges 128, which rest upon the flat portions 124 of the surround 123. Bolts pass through the superposed flanges of the members 120, 121, the diaphragm, the flanges 124 of the surround 123, and the flanges 128 of the jacket 126, clamping the peripheral margin of the diaphragm.

Referring now to the means for reciprocating the diaphragm, the motor 34, Figures 1a, 4, 5 and 11, through gearing represented by the numeral 129, operates a cam 130 mounted on the outer end of shaft 131, journaled in bearings 132 mounted on a base 133 which bridges the cross pieces 32 and is welded or otherwise suitably secured thereto. The cam operates against a roller 134, mounted on a pin 135 between the spaced sides 136 of a swinging arm 137, which is hingedly carried by a pintle 138, which Figure 11 indicates is welded to the adjacent cross piece 32. At the outer end of the swinging arm 137 a vertical arm 139 is pivoted at 140. Said vertical arm also consists of spaced sides 141, as shown in Figure 4, the upper ends of said sides being pivotally connected to trunnions 142 projecting from a cross head 143, which is bushed as at 144 in Figure 11, and surrounds the stem 116 of the catapult, but is fixed to said stem by means such as the set screw 145.

Figures 9, 10:
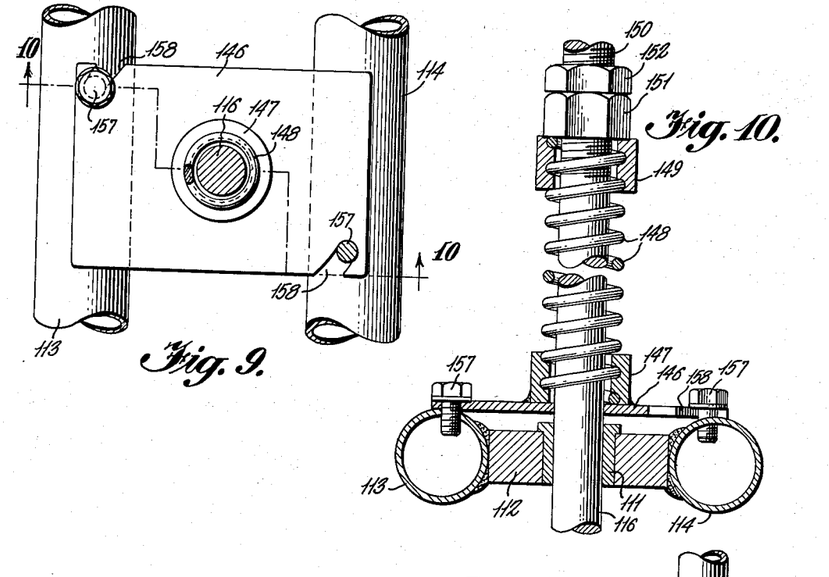
Figure 9 is a section taken along the line 9—9 of Figure 4.
Figure 10 is a vertical section taken along the line 10—10 of Figure 9.
Figure 11:
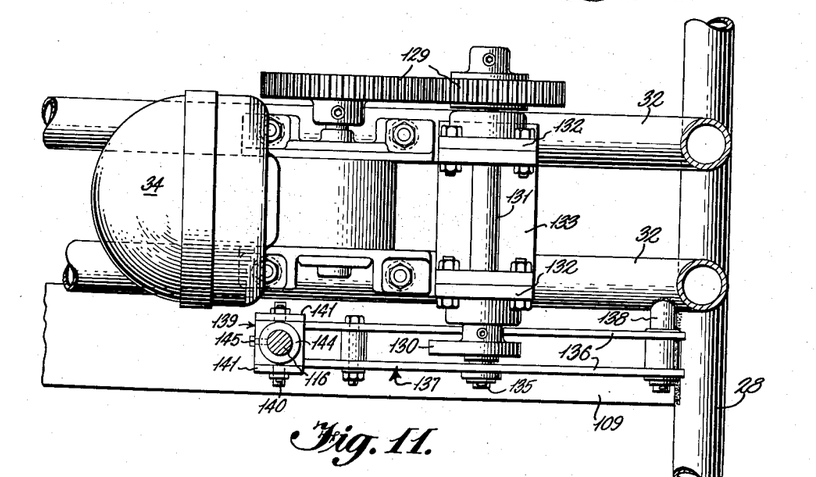
Figure 11 is a section taken along the line 11—11 of Figure 5.

A spring unit surrounds the stem 116 of the catapult, being shown in detail in Figure 10, consisting of a platform 146 (see also Figure 9), having a boss 147 fixed to its upper side, said boss constituting the seat for the lower end of a rather powerful helical spring 148 which surrounds the stem. The upper end of the spring is seated in a thrust washer 149. In the embodiment shown, the bushing and thrust washer are formed with interior helical grooves in which the respective ends of the spring screw, so that the spring and the platform at the bottom and thrust washer at the top are a unitary structure. The stem 116 has a threaded zone 150 on which an adjusting nut 151 and a lock nut 152 are screwed. Above the threaded zone the stem has a reduced portion 153 which terminates in a threaded end portion 154, in which the nuts 155 are screwed, which retains between them the U-shaped lug 156 which forms a connection between the stem of the catapult and the diaphragm, as will appear. The platform 146 is bolted at opposite corners to the cross pieces 113 and 114 by the stud bolts 157. As a matter of convenience in disassembling, the stud bolts pass through open ended slots 158 in the platform, so that the latter can be partially rotated after the stud bolts 157 have been loosened, thereby detaching the spring unit from the frame.

The function of the catapult is that of a vibrator to dash nut fragments or other granular material against the tacky surfaces of the enrobed cones. The upper face of the diaphragm acts as a table upon which the nut fragments rest, and from which they are thrown into the air to a height sufficiently to contact the surface of the enrobing coating. The vibration must be in the nature of repeated impact blows. This is accomplished through the action of the cam 130 correlated with that of the spring 148. The cam is rotated in the direction of the arrow. It has quite a long throw represented by the difference between the line $a$ and the line $b$. The swinging arm 137 is depressed by the cam to the lowest point represented in Figure 5, drawing down the stem 116 of the catapult against the tension of the spring 148. After this point the height of the cam falls off quite abruptly so that the spring 148 when released expands with considerable suddenness, forcing the diaphragm upward, causing the nut fragments to be projected into the air. It is desirable to have the surfaces of all of the cones uniformly coated, and it is also highly desirable that the nut fragments shall not fly out at the open ends of the tunnel constituted by the casing 126. Consequently, the diaphragm 117 is given a predetermined shape, which by trial and error has been found to give the optimum direction of trajectory of the vibrated particles. The lug 156 is a rigid part of an elongated horizontal support 159, having down turned side flanges 160 and rounded down turned ends 161, the former being in the interest of rigidity and the latter presenting a rounded surface in contact with the diaphragm when the latter is vibrated upwardly to minimize wear of the diaphragm. The support 159 is in contact with a plate 162, formed with a dihedral angle along its longitudinal center, said plate being longer than wide, so as to come closer to the closed sides of the casing 27 than to the open ends thereof, the comparison being readily made by reference to Figures 4 and 5. A conformer 163 is provided in the form of a stiff rod or wire, which lies in the dihedral apex of the plate 162, the diaphragm intervening. The conformer 163 has threaded shanks 164 welded thereto, and which project through aligned holes in the plate 162 and support 159. Nuts on said shank press the conformer against the diaphragm, and cause the latter to conform to the dihedral shape of the plate 162, thus forming a dihedral depression in the diaphragm which comes close to the closed sides and less close to the open sides of the casing 126.

Nut fragments or other granular material may be supplied to the catapult through the door 165 at the top of the casing 126. Since the conveyor bar 60 intersects the opening closed by said door, an inverted trough-shaped guard 166 bridges said opening, overlying the path of movement of the conveyor bar and being secured to said casing. Nut fragments from the sloping portions of the diaphragm which constitute the dihedral depression will be thrown in inclined trajectories in opposite directions. Nut fragments on the marginal portions surrounding the dihedral depression will be thrown more nearly vertically, and since these outlying portions of the diaphragm are wider adjacent the open ends of the casing 126, the tendency of the nut fragments to be thrown out at the ends of the tunnel is minimized. Furthermore, when the basket with its complement of ice cream-cones is within the casing 126, the open ends of the casing are for the most part occluded by the presence of the cones. The upturned ends 167 of the conformer 163 prevent wearing contact of the ends of the conformer with the diaphragm.

It is a peculiarity of most nut meats or fragments of the same that if they are constantly beaten or jarred they sweat oil, and if the surface is oily the adherence of the nut fragments to the chocolate coating is impaired. Consequently, it will not do for the catapult 115 to work continuously, but only intermittently, and for such short periods as are essential to effect the proper density of distribution of nut fragments upon the coated surface of the cones. Therefore, a timer switch 168 is provided, suitably supported within the tunnel of the casing 126, the details of which are not shown, being conventional, said timer including an actuating arm 169 at the end of a shaft 170, which extends within the timer and is part of the mechanism of the same. Said actuating arm extends over the track 23 in position to be struck by the front corner of the basket. Since the basket is moving into position at the nut applying station when this engagement takes place, the arm 169 will be swung laterally, starting the timer by the time the basket is in place at said station. The motor circuit is closed simultaneously with the starting of the timer, and the period during which the nuts are applied is determined by the interval for which the timer is set. This interval generally continues until the basket has begun to travel toward the bagging station so that the actuating arm 169 will still be in deflected position when the rear corner of the basket passes it, and will not be affected by the passing of said rear corner.

The set screw 145 which secures the operating means to the stem 116 of the catapult constitutes an adjustment which determines the amplitude of the reciprocation of the catapult, and therefore determines the force as well as the height to which the nut fragments will be thrown by said catapult.

The upward movement of the catapult is not restrained by the cam 130. When the roller 134 falls abruptly from the long axis of the nose of the cam, the spring 148 which is unitary with the platform 146 and with the front washer 149, is free to suddenly expand to its full repose length and a little more, due to its inertia; this being the measure of the upward movement of the diaphragm. The force of the spring is transmitted through the adjusting nut 151 with which the thrust washer 149 is already in contact, so that the push is a little less than a true impact blow. The nut 151 adjusts the compression of the spring 148, and auxiliary or alternative to the adjustable cross head 143, it is a means for determining the limit of upward movement of the diaphragm.

Figure 14:
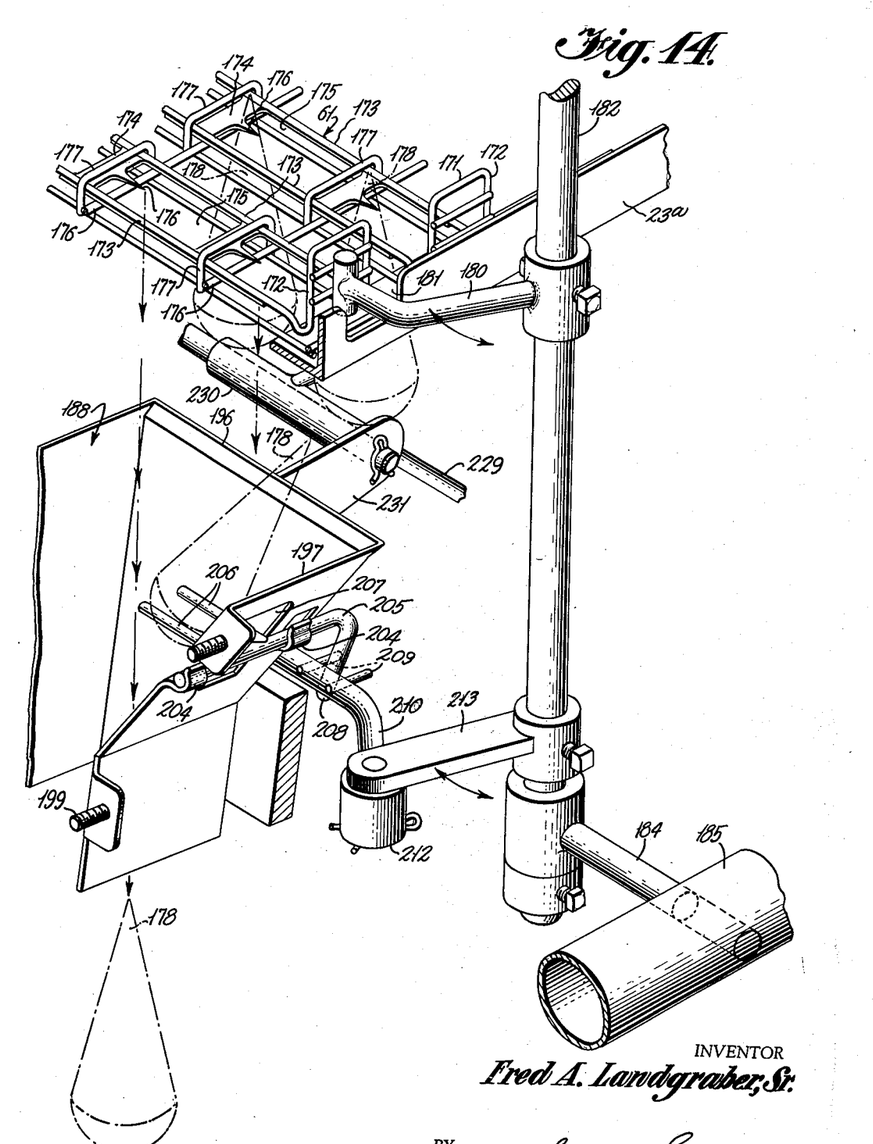
Figure 14 is a perspective view of the means for releasing the cones a row at a time, and two simultaneously to each of the packaging hoppers, and detaining one of the two momentarily in the hopper to obtain sequential discharge of the cones from the hopper.

The packaging of the finished confections begins with their release from the basket. Figure 14 shows a portion of the basket 61, the side of the basket being parallel to the showing of the track extension 23a in said figure. It will be noted that within the basket, and individual to each transverse row of cones, there is a sliding frame 171 comprising an upstanding end portion 172, and longitudinal rods or wires 173. Secured to the longitudinal wires is a sheet metal plate 174, which extends the full length of a row of six cones and is stamped with cutouts 175 which define impaling points 176, all pointing in the same direction. There are six impaling points to the row. The sliding frame is guided within inverted U-shaped loops 177, which are unitary with the relatively stationary part of the basket. The loops preferably divide the row into six spaces. The tapered ends of the ice-cream cones 178 project upwardly through said spaces and through the cutouts, by means which do not form a part of the present invention, and therefore are not disclosed, but which are conventional, as is the type of basket. The cones are inserted and the sliding frames moved toward the right, as viewed in Figure 14, so that the impaling points penetrate the cones and hold the ice-cream cones in place. This loading of the baskets is done without the confections being touched by human hands. A section through the basket 61 is shown in Figure 12. In this figure the basket is shown supported by the track extensions 23a, which are sustained by the brackets 179 extending inwardly from the corner post 58 which they penetrate, and to which they are welded. There are two pair of brackets, one for the front corner posts and another for the corner posts to which the track extension is secured by means of thumb screws. The sliding frames are pushed into release position by means of an arm 180, also shown in Figure 14, which operates through a recess 181, formed in the vertical flange of the adjacent track extension. This recess can be seen also in Figure 13.

The arm 180 is fixedly mounted upon a vertical oscillating shaft 182. This shaft is journalled at the top in a bearing at the end of a bracket 183, which extends inwardly from one of the top rails 59, and at the bottom by a bearing in a similar bracket 184, which extends inwardly from one of the intermediate longitudinal frame members 185. Since these brackets extend in perpendicular planes, they afford a rigid alignment for the shaft 182. This shaft is oscillated by means of a radial arm 186 fixed to said shaft and having a slot connection with a pin 187 fixed to the top of the conveyor bar 60. As said bar reciprocates it oscillates the arm 186.

All of the cones in one transverse row are released at one time. Below the row of cones are three chutes 188. Each of these has a mouth at the top, wide enough to receive simultaneously two adjacent cones, and each has a downward end wide enough to discharge only one cone at a time. Consequently, when two cones enter simultaneously, one is retarded while the other falls through, and then the retarded one is released to follow, so that the two cones come out of the discharge end in sequence. Beneath the mouths of the chutes are three bag bins 189, where bags are pneumatically opened in the paths of the descending cones and so synchronized with the cone releasing mechanism as to provide an open bag timely for the reception of each cone.

Reverting now to a detailed description of the chutes, there are two short fittings 190, one at each side, welded to the intermediate longitudinal frame members 185. A flat bar 191 extends transversely of the frame and is bolted to these fittings at 192. This bar supports the chutes. Each chute consists of a flat back plate 193, from the rear of which a single stud 194 projects and also a dowel 195, Figure 13. The securing means have an inclined relation indicated on the middle chute in Figure 12. The bar 191 has corresponding holes, so that when the chute is placed against the bar with the stud in one hole and the dowel in the other, and a nut is screwed upon the stud, the chute is securely held. This mode of securing the chutes in place makes it easy to remove them at any time for cleansing or for other purposes. The plates 193 have forwardly turned flanges 196 which define the sides of the chute. One of said flanges, that to the right in each chute, diverges from an intermediate point toward the top of the chute, forming an inclined face 197. A front plate 198 is common to all of the chutes. This is shown in section in Figure 13, and at the right and lefthand sides in Figure 12. It is secured by means of the bolts 199. The front plate has holes to which are connected the branches 200 of an air manifold 201, which is supplied with an air blast from the blower 202, shown in Figure 1b, which is driven by its own motor, not shown. The branches 200 of the air manifold are so directed that the current which enters the chute impinges in a downward direction against the inner or far edge of the chute, as indicated by the arrows. The air blast has to do with opening the bags for the reception of the cones. Figure 13 shows a bag 203 in open receptive position.

Referring now to Figure 14, it will be noted that the flared face 197 has stamped out tongues 204, which form bearings for a bell crank 205, which has a pair of spaced fingers 206 extending through an opening 207 in said face into the chute, but sufficiently short not to obscure the direct line of descent of the lefthand cone of a pair through the chute. At its other end, the bell crank has a downwardly extending arm 208. The arms 208 of all the bells cranks are loosely embraced between pairs of pins 209, carried by a bar 210, which oscillates behind the chutes, being slidably supported in a hole in the lug 211, Figure 1b, which projects from the rear of the lefthand shute 188. Said bar makes a pin and slot connection 212 with an arm 213 on the shaft 182, by means of which reciprocatory movement is imparted to said bar.

The arms 180 and 213 are so synchronized that at the moment the cones are released from the basket, the fingers 206 are beginning to turn in a downward direction, so that when the cones traveling side by side enter the chute, one passes through while the other is only for the briefest moment detained by the spaced fingers, and then permitted to proceed gravitationally. This instantaneous detention is sufficient to place the detained cone in sequential relation to the unimpeded cone at their point of discharge from the chute.

Referring now to the bag bins 189, there are two spaced rods 214 extending between the lower longitudinal frame members 215. On these rods are the three pairs of members which constitute the bag bins. Each of these members comprises a side wall 216, to the lower inner side of which is welded a pair of spaced hollow bosses 217, which are slidable upon the rods 214. These bosses have set screws 218, so that the side walls can be adjusted to accommodate bags of different width. On the inner sides of the side walls are welded the curvilinear flanges 219, which together form the bottom or slideway of the bag bin. The flanges 219 curve away from one another, forming a flaring opening 220 as shown in Figure 13. At the front, the side walls are provided with the inturned lugs 221 at an intermediate point in their height, and at the level of the flanges 219 with similar lugs 222. These lugs are spaced so as to engage a small margin of the bag when unstressed by the bulk of the cone. When a cone enters the bag and stretches it from back to front, the bag narrows widthwise and escapes from between the lugs. Beneath the opening 220 between the flanges 219 of each bin is a forwardly downwardly inclined ramp 223, the upper end of which is sufficiently narrow to enable it to fit between the bosses 214, said ramp having bifurcated lugs 224 which embrace the forward rod 214 to hold the ramp in place. Beneath the ramp is an endless conveyor belt 225, which carries away the bagged cones for boxing and storage.

Figures 1b and 13 show a generally horizontal stack of bags 226 in one of the bag bins. The bag has a rear lip a little higher than the forward lip, and each chute is provided with a downwardly extending tongue 227, from which the shorter forward lip escapes, but which temporarily retains the rearward lip, as shown in Figure 13. A weighted presser plate 228 presses against the rear of the stack, keeping the bags together and moved forwardly against the lugs 221 and 222. The three presser plates are attached by arms 229 to a horizontal shaft 230, which is carried in bearings in lugs 211 and 231, which extend from the rear walls of the end chutes. The shaft 230 also has an arm 232, which carries an adjustable weight 233. This weight imparts pressure to all of the pressure plates.

In operation, the blast from the blower 202 is continuous. As soon as a bag assumes front position in the stack with its forward lip free and its rear lip held, the blast impinges upon the tongue 227, going into the bag and separating its lips, thereby expanding its mouth in readiness to receive a cone. The first cone to arrive is the one that had direct undetained passage through the chute, which enters the bag in inverted position, frees the bag from the lugs 221 and 222 in the manner described so that the bag and cone fall upon the ramp 223 and slide upon the conveyor, the closed edge of the bag being foremost. Meanwhile, that is to say, just as soon as the filled bag has left its foremost position in the stack, the next bag is opened by the air blast and the momentarily detained cone drops into it. Figure 13 shows that the conveyor belt 225 is wide enough to commonly serve all three chutes.

While I have in the above invention disclosed what I believe to be a preferred and practical embodiment of the inventive concept, it will be understood by those skilled in the art that the specific construction and arrangement of parts, as shown, are by way of example and not to be construed as limiting the scope of the invention.

What I claim is:

1. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable impaling means individual to the rows, means for releasing said cones a row at a time, a reciprocatory pusher for moving said basket on said track to bring each row of cones sequentially into operative proximity to said releasing means, chutes beneath the row of cones at the releasing point there being one chute to each pair of cones, one side of said chute being vertical, the other inclined, the upper mouth of said chute being wide enough to receive both cones of the pair side by side, the lower mouth of said chute being adjacent said vertical side and wide enough to discharge only one cone at a time, said chute providing an uninterrupted gravitational path of descent for one cone of a pair, retractable means projecting through the inclined side of said chute to momentarily detain the other cone of the pair, whereby both cones are discharged sequentially from the lower mouth, and means for presenting open bags in sequence beneath the lower mouths of said chutes to receive the cones as they are discharged from said chutes.

2. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable slides individual to the rows having impaling points which hold the cones in one position of said slide and which release the cones of a row simultaneously when said slide is oppositely moved, a shaft mounted on said frame, an arm carried by said shaft operative at a release point to move the slides of said basket to release position successively as they are brought to the release point, a reciprocatory conveyor bar, a series of unidirectional pawls successively engageable with said basket to bring the rows of cones step by step to said release point, means for reciprocating said conveyor bar, a connection between said bar and shaft for oscillating the latter, chutes beneath the row of cones which is at the releasing point, there being one chute to each pair of cones in said row, one side of said chute being vertical, the other inclined, the upper mouth of said chute being wide enough to receive both cones of the pair side by side, the lower mouth of said chute being adjacent said vertical side and wide enough to discharge only one at a time, said chute providing an uninterrupted gravitational path of descent for one cone of a pair, retractable means projecting through the inclined side of said chute to momentarily detain the other cone of the pair whereby both cones are discharged sequentially from the lower mouth, connections between said shaft and said retractable means for operating the latter, and means for presenting open bags in sequence beneath the lower mouths of said chutes to receive the cones as they are discharged from said chutes.

3. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable slides individual to the rows having impaling points which hold the cones in one position of said slide and which release the cones of a row simultaneously when said slide is oppositely moved, a shaft mounted on said frame, an arm carried by said shaft operative at a release point to move the slides of said basket to release position successively as they are brought to the release point, a reciprocatory conveyor bar, a series of unidirectional pawls successively engageable with said basket to bring the rows of cones step by step to said release point, means for reciprocating said conveyor bar, a connection between said bar and shaft for oscillating the latter, chutes beneath the row of cones which is at the releasing point, there being one chute to each pair of cones in said row, one side of said chute being vertical, the other inclined, the upper mouth of said chute being wide enough to receive both cones of the pair side by side, the lower mouth of said chute being adjacent said vertical side and wide enough to discharge only one at a time, said chute providing an uninterrupted gravitational path of descent for one cone of a pair, a rock shaft at the inclined side of each chute, spaced fingers carried by said rock shaft projecting into said chute upon which the other ice-cream cone is momentarily detained in its gravitational descent, said rock shaft having an operating arm offset from its axis, a reciprocating bar carrying means engaging the operating arms of all said rock shafts for tilting the spaced fingers away from the path of movement of said other cone, a connection between said bar and shaft for reciprocating said bar, and means for presenting open bags in sequence beneath the lower mouths of said chutes to receive the cones as they are discharged from said chutes.

4. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable impaling means individual to the rows, means for releasing said cones a row at a time, a reciprocatory conveyor for moving said basket to bring each row of cones sequentially into operative proximity to said releasing means, chutes beneath the row of cones at the releasing point there being one chute to each pair of cones, one side of said chute being vertical, the other inclined, the upper mouth of said chute being wide enough to receive both cones of the pair side by side, the lower mouth of said chute being adjacent said vertical side and wide enough to discharge only one cone at a time, said chute providing an uninterrupted gravitational path of descent for one cone of a pair, retractable means projecting through the inclined side of said chute to momentarily detain the other cone of the pair, whereby both cones are discharged sequentially from the lower mouth, a bag bin for each chute underlying the same, each bin comprising side walls and a bottom, adapted to hold a stack of bags with the bags in general upright position with open ends uppermost, the bags being of a type in which the rear wall extends above the front wall at the open end, each chute having a downward extension at the rear overlying the corresponding bag bin at the front of said bin, terminating above the level of the front wall but below the level of the rear wall of the bag so as to leave the front wall free, a pusher behind said stack for urging it forward, holding the rear wall of the foremost bag against said extension, means for blowing a current of air downwardly against said extension for opening said foremost bag to receive a cone, said bags with the enclosed cone being released from said bin through the impact of the entering cone.

5. In apparatus for packaging a frozen confaction of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable impaling means individual to the rows, means for releasing said cones a row at a time, a reciprocatory conveyor for moving said basket to bring each row of cones sequentially into operative proximity to said releasing means, chutes beneath the row of cones at the releasing point there being one chute to each pair of cones, one side of said chute being vertical, the other inclined, the upper mouth of said chute being wide enough to receive both cones of the pair side by side, the lower mouth of said chute being adjacent said vertical side and wide enough to discharge only one cone at a time, said chute providing an uninterrupted gravitational path of descent for one cone of a pair, retractable means projecting through the inclined side of said chute to momentarily detain the other cone of the pair, whereby both cones are discharged sequentially from the lower mouth, a bag bin for each chute underlying the same, each bin comprising side walls and a bottom, adapted to hold a stack of bags with the bags in general upright position with open ends uppermost, the bags being of a type in which the rear wall extends above the front wall at the open end, each chute having a downward extension at the rear overlying the corresponding bag bin at the front of said bin, terminating above the level of the front wall but below the level of the rear wall of the bag so as to leave the front wall free, said side walls having inturned lugs at the front just long enough to retain the side edges of a bag unweighted by contents, a pusher behind said stack for urging it forward, holding the rear wall of the uppermost bag against said extension and the side edges against said lugs, means for blowing a current of air downwardly against said extension for opening said foremost bag to receive a cone, said bags with the enclosed cones being released from said bin through the impact of the entering cone.

6. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable impaling means individual to the rows, means for releasing said cones a row at a time, a reciprocatory conveyor for moving said basket to bring each row of cones sequentially into operative proximity to said releasing means, chutes beneath the row of cones at the releasing point there being one chute to each pair of cones, one side of said chute being vertical, the other inclined, the upper mouth of said chute being wide enough to receive both cones of the pair side by side, the lower mouth of said chute being adjacent said vertical side and wide enough to discharge only one cone at a time, said chute providing an uninterrupted gravitational path of descent for one cone of a pair, retractable means projecting through the inclined side of said chute to momentarily detain the other cone of the pair, whereby both cones are discharged sequentially from the lower mouth, a bag bin for each chute underlying the same, each bag bin comprising side walls and a bottom adapted to hold a stack of bags with the bags in general upright position with open ends uppermost, the bags being of a type in which the rear wall extends above the front wall at the open end, each chute having a downward extension at the rear overlying the corresponding bag bin at the front of said bin, terminating above the level of the front wall but below the level of the rear wall of the bag so as to leave the front wall free, said side walls having inturned lugs at the front just long enough to retain the side edges of a bag unweighted by contents, a pusher behind said stack for urging it forward, holding the rear wall of the foremost bag against said extension, and the side edges against said lugs, a plate forming the front walls of said chutes having openings therethrough constituting air nozzles, directed downwardly.

7. In apparatus for packaging a frozen confection of the type which consists of an ice-cream cone filled with frozen mix, said apparatus comprising a frame, a track extending through said frame supported thereby, a basket slidable on said track, said basket being of the type which suspends the inverted frozen filled ice-cream cones in a plurality of transverse rows through the instrumentality of releasable impaling means individual to the rows, means for releasing said cones a row at a time, a reciprocatory conveyor for moving said basket to bring each row of cones sequentially into operative proximity to said releasing means, chutes beneath the row of cones at the releasing point there being one chute to each pair of cones, one side of said chute being vertical, the other inclined, the upper mouth of said chute being wide enough to receive both cones of the pair side by side, the lower mouth of said chute being adjacent said vertical side and wide enough to discharge only one cone at a time, said chute providing an uninterrupted gravitational path of descent for one cone of a pair, retractable means projecting through the inclined side of said chute to momentarily detain the other cone of the pair, whereby both cones are discharged sequentially from the lower mouth, a bag bin for each chute underlying the same, each bag bin comprising side walls, means for adjusting said side walls laterally to vary the width of said bins, flanges carried by said side walls on their inner sides cooperating to form a bottom for the bin, said bins being adapted to hold a stack of bags with the bags in general upright position with open ends uppermost, the bags being of a type in which the rear wall extends above the front wall at the open end, each chute having a downward extension at the rear overlying the corresponding bag bin at the front of said bin, terminating above the level of the front wall but below the level of the rear wall of the bag so as to leave the front wall free, said side walls having inturned lugs at the front just long enough to retain the side edges of a bag unweighted by contents, a shaft mounted horizontally behind said chutes, radial arms on said shaft one for each bin, a pusher plate at the end of each of said arms adapted to bear against the rear of said stacks, an additional radial arm on said shaft, means for biasing said additional arm and transmitting pressure to said pusher plates for urging the stacks of bags forward, holding the rear walls of the foremost bags against said extensions and holding the side edges against said lugs, the bottoms of said bins being curved approximately to the arcuate paths of movement of said pusher plates, a plate forming the front walls of said chutes having openings therethrough constituting air nozzles directed downwardly toward said extensions, a manifold having branches connected to said nozzles, and a blower connected to said manifold for blowing currents of air downwardly against said extensions for opening the foremost bags each to receive a cone, said bags with the enclosed cones being released from said bins through the impact of the entering cones.

FRED A. LANDGRABER, Sr.

References Cited in the file of this patent

UNITED STATES PATENTS

| Number | Name | Date |
|---|---|---|
| 2,339,437 | Taylor | Jan. 18, 1944 |
| 2,524,673 | Martin | Oct. 3, 1950 |
| 2,528,997 | Blanchard | Nov. 7, 1950 |
| 2,579,696 | Perlman | Dec. 25, 1951 |